(No Model.)

A. WICKEY.
INCUBATOR.

No. 530,567. Patented Dec. 11, 1894.

Witnesses:
Charles O. Hervey
A. H. Ebberson

Inventor:
Andrew Wickey
by Wiles Greene & Bitner
Attys

UNITED STATES PATENT OFFICE.

ANDREW WICKEY, OF CHICAGO, ILLINOIS.

INCUBATOR.

SPECIFICATION forming part of Letters Patent No. 530,567, dated December 11, 1894.

Application filed September 14, 1892. Serial No. 445,862. (No model.)

*To all whom it may concern:*

Be it known that I, ANDREW WICKEY, a citizen of the United States, residing at Chicago, in the county of Cook and State of Illinois, have invented certain new and useful Improvements in Incubators, of which the following is a specification.

My invention relates particularly to the nests upon which the eggs are placed for hatching. When eggs are hatched artificially, it is necessary to provide means for turning them, and great difficulty has been encountered in finding means such as to fully guard against unduly exposing the eggs to change of temperature.

My invention completely obviates the difficulty, in providing means whereby the eggs may be gently turned to any desired extent without subjecting them to even the possibility of change of temperature.

Figure 1:
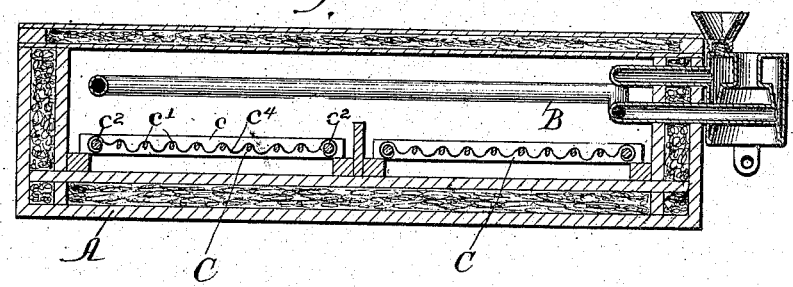
Figure 2:
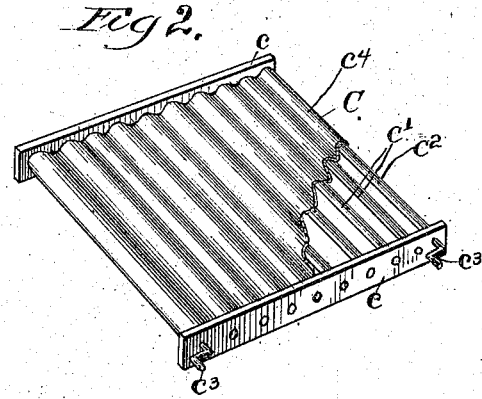

To illustrate the invention, I have chosen a simple form of incubator and have shown the same in vertical section in Figure 1 and the egg tray thereof in perspective in Fig. 2, of the accompanying drawings.

In the drawings, A is the incubator box; B, a suitable heating device, and C the nest upon which the eggs lie. The nest is shown as composed of side bars $c$, cross rods $c'$, and end rollers $c^2$, the latter provided with handles $c^3$. An apron $c^4$, preferably of cloth, is wound upon the end rollers and extended between them over the cross bars with sufficient slack to sag, between said bars, and form little hollows deep enough to receive the eggs and prevent their rolling over the bars when the apron is moved back and forth. This renders it easy to turn the eggs as much and as often as may seem necessary, by mere rotation of the end rollers; for since the eggs rest wholly upon the apron and touch nothing else, they turn with the utmost certainty to a degree corresponding with the distance through which the underlying apron travels from side to side.

What I claim is—

A nest comprising a frame, a series of cross bars, rollers at the opposite sides of the frame, and a flexible apron wound upon the rollers and extending between the same over the cross bars with enough slack to sag between the bars sufficiently to prevent the eggs from rolling over the bars when the apron is moved along.

ANDREW WICKEY.

Witnesses:
 CHARLES O. SHERVEY,
 H. BITNER.